United States Patent [19]

Siu et al.

[11] Patent Number: 5,452,339

[45] Date of Patent: Sep. 19, 1995

[54] LOCAL/REMOTE MODIFICATION OF ELECTRONICALLY ALTERABLE OPERATING SYSTEM FIRMWARE RESIDENT IN REDUNDANT FLASH MEMORY OF REMOTE UNIT FOR TESTING/CONDITIONING SUBSCRIBER LINE CIRCUITS

[75] Inventors: Edward K. W. Siu, Simi Valley; Onofrio Schillaci, Camarillo; Michael Kennedy, Ventura; Laura E. Moser, Newbury Park, all of Calif.

[73] Assignee: Harris Corporation, Melbourne, Fla.

[21] Appl. No.: 194,203

[22] Filed: Feb. 9, 1994

[51] Int. Cl.6 .................. H04M 1/24; H04M 3/08; H04M 3/22

[52] U.S. Cl. ........................................ 379/27; 379/1; 379/10; 379/22; 379/29; 379/31

[58] Field of Search .................. 379/1, 10, 22, 27, 29, 379/31

[56] References Cited

U.S. PATENT DOCUMENTS

| | | | |
|---|---|---|---|
| 4,937,851 | 6/1990 | Lynch | 379/27 |
| 5,018,184 | 5/1991 | Abrams | 379/29 |
| 5,195,124 | 3/1993 | Ishioka | 379/29 |

Primary Examiner—Stephen Chin
Assistant Examiner—Vijay Shankar
Attorney, Agent, or Firm—Charles Wands

[57] ABSTRACT

A remote measurement unit for testing and conditioning one or more telephone lines includes multiple electronically erasable flash memory banks, which contain respective versions of the operating system employed by the test unit's micro-controller. An operating system modification routine employed by the host processor of a remote site allows the functionality of the remote test unit to be selectively modified by electronically installing an upgraded or downgraded version of the operating system, or by electronically selectively activating or deactivating one or more operational features of the currently active operating system. A reset routine ensures that the operating system modification mechanism will only boot up the 'correct' one of the two quasi-redundant systems available to the RMU's microcontroller after a system modification has been performed. In addition, the temporary insertion of a no-op code field just prior to the beginning of the program prevents the RMU's processor from accidentally booting up a modified system until the system has been verified as operational.

34 Claims, 3 Drawing Sheets

| | | |
|---|---|---|
| 0 | F3 (DISABLE SCHEDULE) | |
| 1 | C3 (JUMP TO) → | 00 (NO OP) |
| 2 | 00 (NO OP) | |
| 3 | 00 (NO OP) | |
| 4 | C3 (JUMP TO) → | 00 (NO OP) |
| 5 | 00 (NO OP) | |
| 6 | 00 (NO OP) | |
| 7 | C3 (JUMP TO) → | 00 (NO OP) |
| 8 | 00 (NO OP) | |
| 9 | 00 (NO OP) | |
| 10 | BEGIN OP SYSTEM | |

LOCAL/REMOTE MODIFICATION OF ELECTRONICALLY ALTERABLE OPERATING SYSTEM FIRMWARE RESIDENT IN REDUNDANT FLASH MEMORY OF REMOTE UNIT FOR TESTING/CONDITIONING SUBSCRIBER LINE CIRCUITS

CROSS-REFERENCE TO RELATED APPLICATIONS

The present invention relates to subject matter described in co-pending application Ser. No. 08/193,814, filed coincident herewith, entitled: "User-controlled Electronic Modification of Operating System Firmware Resident in Remote Measurement Unit for Testing and Conditioning of Subscriber Line Circuits," by L. Moser et al, assigned to the assignee of the present application and the disclosure of which is herein incorporated.

FIELD OF THE INVENTION

The present invention pertains in general to communication systems, such as telephone systems, and is particularly directed to a mechanism for electronically modifying the functionality of a quasi-redundant measuring and test routine, stored in auxiliary flash memory of a programmable test device, for monitoring and testing network lines and subscriber termination equipment coupled thereto, without the need for on-site, physical access, removal and replacement of digital processor and memory circuitry of the test device.

BACKGROUND OF THE INVENTION

Measuring and test equipment currently employed by telephone service providers customarily contain a variety of conditioning and signal generation capabilities which enable service and maintenance personnel to apply a prescribed number of electrical stimuli to a line (a digital subscriber loop), for the purpose of troubleshooting the line and measuring its performance. A non-limitative example of such equipment is diagrammatically illustrated in FIG. 1, which shows the distribution of a plurality of (microprocessor-controlled) remote measurement units (RMUs) 11, which are installed at a plurality of sites geographically remote with respect to each other and a supervisory site 12.

RMUs 11 include various components, such as tone generation and electrical conditioning circuitry, which, under the control of a firmware-resident measurement and test mechanism employed by an on-board processor, selectively transmit prescribed test signals to the line, and may also condition the line with prescribed electrical circuit parameters, that allow an associated line monitoring unit to conduct line measurements and thereby determine the current state of the line and its ability to successfully perform as intended.

For this purpose, each RMU 11 is typically of the type that conforms to computer interface requirements defined in Issue 3 of AT&T Publication KS-23253, and contains internal firmware which is operative to perform various diagnostic or test operations on network lines 13 and (subscriber) termination equipment 15, by means of one or more host computers, video display terminals (VDTs) or data terminal units (DTUs) 14 at the supervisory site 12, which have the capability of accessing the remote test equipments 11 through attendant modem devices 16, such as industry standard Hayes 'AT'-compatible 300/1200 units, that are linked to a central office 18. Additionally, via a modem interface 17, an operating support system (OSS) 19 may coordinate testing via RMU 11 and other test systems employed by central office 18.

Because the test and conditioning capabilities may vary among customers and different versions of such equipment, whenever it is necessary to perform a repair, or effect a change to the functionality of the test unit's firmware (e.g. change an instruction set), it is customary practice for a service technician (craftsperson) to travel to the site where the equipment is installed, and either make a component or board replacement in the field, or, as is more often the case, retrieve the unit, bring it back to a servicing site, where a repair or retrofit is performed, and then return the modified unit to the remote site, so that it may be placed back in service with the upgraded functionality.

The above-identified co-pending application describes a mechanism which substantially reduces the cost in labor and down time required to service a remote test unit in such a conventional manner by configuring the firmware-memory architecture of the unit's micro-controller of a pair of redundant, erasable flash memory systems, each of which stores a 'quasi-redundant' version of the operating system firmware employed by the test device. The use of flash memories allows the resident firmware to be selectively, electronically modified, from a supervisory device, such as a personal computer coupled through a modem to the central office, or via a personal computer connection to a serial port of the test unit.

More particularly, as shown diagrammatically in FIG. 2, associated with the control processor 20 of the remote measurement and test unit are two flash memory systems 21, 22, which store respective electronically modifiable active and inactive (quasi-redundant) versions of the operating system software used by the test device's microprocessor. By 'quasi-redundant' is meant that each memory system contains a version of the firmware that is potentially capable of operating the RMU. Control processor 20 and flash memory systems 21 and 22 are coupled with an RMU system bus 23 together with attendant random access memory (RAM) 24, a watchdog timer 26 and input/output (I/O) interface unit 25 (containing associated analog-to-digital converter (ADC), digital-to-analog converter (DAC) units and other I/O relays with which a line under test (LUT) may be controllably connected).

As shown in FIG. 3, a respective flash memory system 30 (of which each of memory systems 21 and 22 in FIG. 2 is configured) is comprised of one of more memory modules 31 having a cumulative address space sufficient to allow for additions to a resident operating system and to provide attendant service random access memory. The memory space of a respective flash memory system is partitioned in banks of a prescribed depth each. In the non-limitative example shown in FIG. 3, a respective flash memory system 30 may comprise a pair of memory modules 31A and 31B, each having a memory space of 128 kbytes, for a total of 256 kbytes of addressable memory space per system. An initial portion 32 (e.g. 32 Kbytes) of each flash memory system contains the same or common operating system code, while the remainder of the system (224 kbytes in the present example) is divided into contiguous, but individually addressable, banks of memory (e.g. fourteen banks 33-1 . . . 33-14) each of a prescribed capacity (e.g. sixteen kbytes).

A respective flash memory device is programmed by initially resetting the entirety of each bank (to all '1's) and then the binary state of selective ones of the memory cells in each reset bank is changed to a '0'. In a like manner, in order to reprogram a previously programmed flash memory device, it is necessary to initially reset the entirety of each to-be-reprogrammed bank (to all '1's), and then change the binary state of one or more memory cells of each reset bank to a '0'.

When the remote measurement unit (RMU) is initially configured for installation at a test and conditioning site, each of its two flash memory systems 21 and 22 will have been loaded with the same firmware, so that, at installation, the two flash memories contain redundant versions of the same operating system. When the test unit is powered-up, its on-board processor defaults to a prescribed one of the pair of memory systems and uses the operating system resident in the default memory system (until that system is modified). Thereafter, when the operating system is to be changed (e.g. upgraded or a previously inactive feature activated), the inactive (off-line redundant) system is modified and the unit is reset. Modification of an operating system may include performing an upgrade (installing a newer version of the firmware through which the functionality of the programmable test device is enhanced); performing a downgrade, which serves to invalidate the currently running version and to activate the (older) version of the firmware contained in the inactive memory system; activating one or more features of the currently running firmware; and deactivating one or more features of a currently running system.

Once modification of the inactive system has been completed, then, in order to change from the currently running system and substitute in its place the modified inactive system, it is necessary to reset the unit. Upon reset, the previously inactive system becomes the active system, while the previously active system, which is now 'quasi-redundant' with respect to the active system goes off-line. All future modifications (other than existing feature activation) operate on the system that is off-line or inactive at the time of the modification.

SUMMARY OF THE INVENTION

The present invention is directed to a reset routine employed by the mechanism described in the above-identified co-pending application to ensure that, upon reset, the 'correct' one of the two quasi-redundant systems available to the RMU's microcontroller will become the operating system. Normally, after a modification, the 'correct' system is the previously off-line system that has been changed. However, should this modified inactive system contain an anomaly that will prevent successful operation of the test device, it is necessary that the inactive system remain off-line and the unit continue to operate with the currently running version of the firmware.

In accordance with the present invention, these two objectives are attained by the use of a prescribed reset routine and by structuring the contents of the modified inactive memory system to include a precursor set of instruction code that prevents an accidental boot-up from the off-line system (in which one or more memory banks have been erased) and thereby avoids anomalous operation of the RMU. For this purpose, a precursor section of the common code memory space is loaded with an instruction sequence that forces the off-line system, if accessed, to perform a continuous no operation loop. Whenever the RMU begins executing the firmware in either system, a time-out clock is started. Unless the operating system code, which is located in memory address space immediately following the no operation loop, begins executing prior to expiration of the time-out, a switch to the other operating system is performed.

Once transfer of modified (e.g. upgraded) software to the designated bank(s) of the inactive system has been completed, and the modified software has been activated by modifying the precursor section of the common code memory space, the host processor in the user's data terminal unit commands the RMU to reset itself. With the RMU containing two different versions of the operating system, one of which is the newer version and the other of which is the previously active routine which is to go off-line, the reset routine of the present invention is executed to ensure that the 'correct' one of the two quasi-redundant systems available to the RMU's microcontroller will become the operating system.

Pursuant to the reset routine, upon reset or power-up, the RMU's control processor boots up that memory system which has not been marked invalid and which contains the highest version of firmware. A first step in the reset routine is to perform an error checking routine on the contents of the common portion of whichever of the two operating system versions the RMU processor provisionally selects. If the common portions of the two operating systems are valid, the routine inquires whether the revision level of the current version of the selected operating system is higher than the revision level of the other (non-booted) system. If the revision level of the current version of the operating system is not higher than the revision level of the other (non-booted) system, then the RMU switches to the other (currently inactive) system. If the revision level of the current version of the operating system is higher than the revision level of the other (non-booted) system, then the RMU checks whether the current version of the operating system has been placed in a 'downgraded' status. If the current version is the latest version of the operating system, but has been downgraded, the routine instructs the RMU' microcontroller to switch to the other system. If, however, the currently booted operating system version is the latest version of the operating system, and is not in downgraded status, the reset is complete.

As described in the above-identified co-pending application, associated with each operational feature of a respective firmware version of the operational system is a status or enabling bit, which may be set to a logical '1' when the firmware is initially installed. Activation of a feature involves switching the state of the feature bit to a logical '0'. Each remotely switchable feature status bit is preferably contained in a feature status table stored in a prescribed portion of memory. To accommodate sixteen features, for example, a pair of sequential feature bytes may be employed. Via a virtual to physical map associated with the feature byte, the user may delineate which feature or features are to be selectively enabled in the active system.

DETAILED DESCRIPTION

Figure 1:
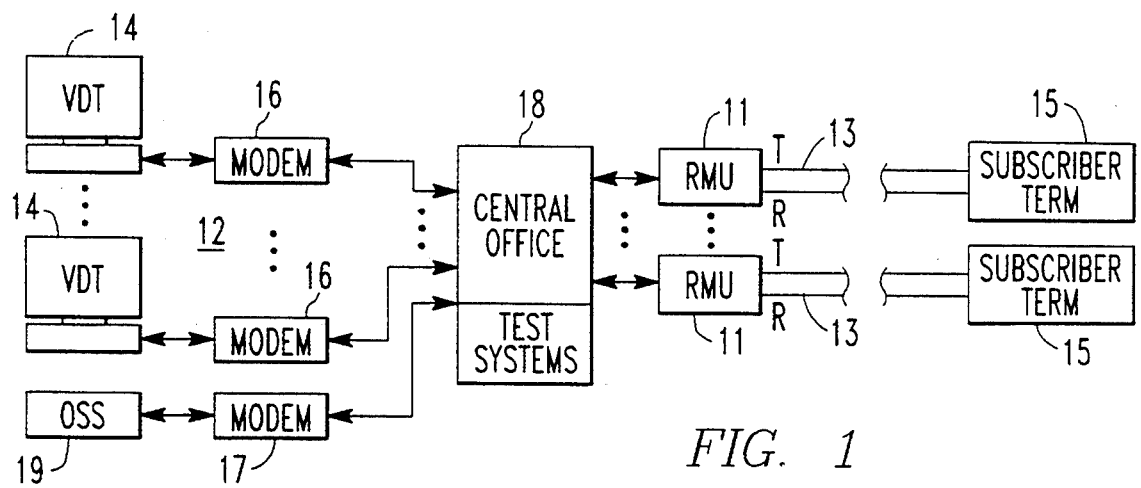
FIG. 1 diagrammatically shows the distribution of a plurality of microprocessor-controlled remote measurement units (RMUs) installed at a plurality of sites geographically remote with respect to each other and a supervisory site.
Figure 2:
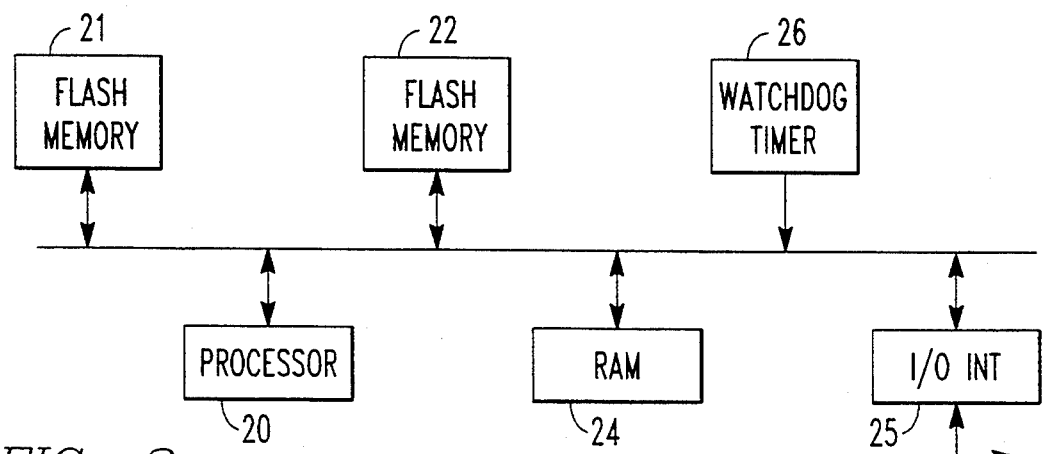
FIG. 2 diagrammatically illustrates the architecture of the micro-controller of an RMU, having system bus, control processor, random access memory, an input/output interface unit, and firmware flash memories.

Before describing in detail the test routine modification mechanism in accordance with the present invention, it should be observed that the present invention resides primarily in the address space organization of the respective flash memory systems of an RMU, which flash memory systems contain respective quasi-redundant versions of operating system firmware of the test unit, together with an augmentation of the control software employed by a 'master' test system controller (host processor) and the micro-controller within a programmable monitor and test unit, which permits the host processor to selectively establish a control link with and electronically modify the contents of a selected one or more of the memory banks of either flash memory system, thereby reprogramming the test unit, while ensuring that, upon reset, the test unit will default to the correct (properly operating, modified) system.

Consequently, the configuration of such a remote test unit and the manner in which it is interfaced with other communication equipment of the telephone network have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

Figures 4, 5:
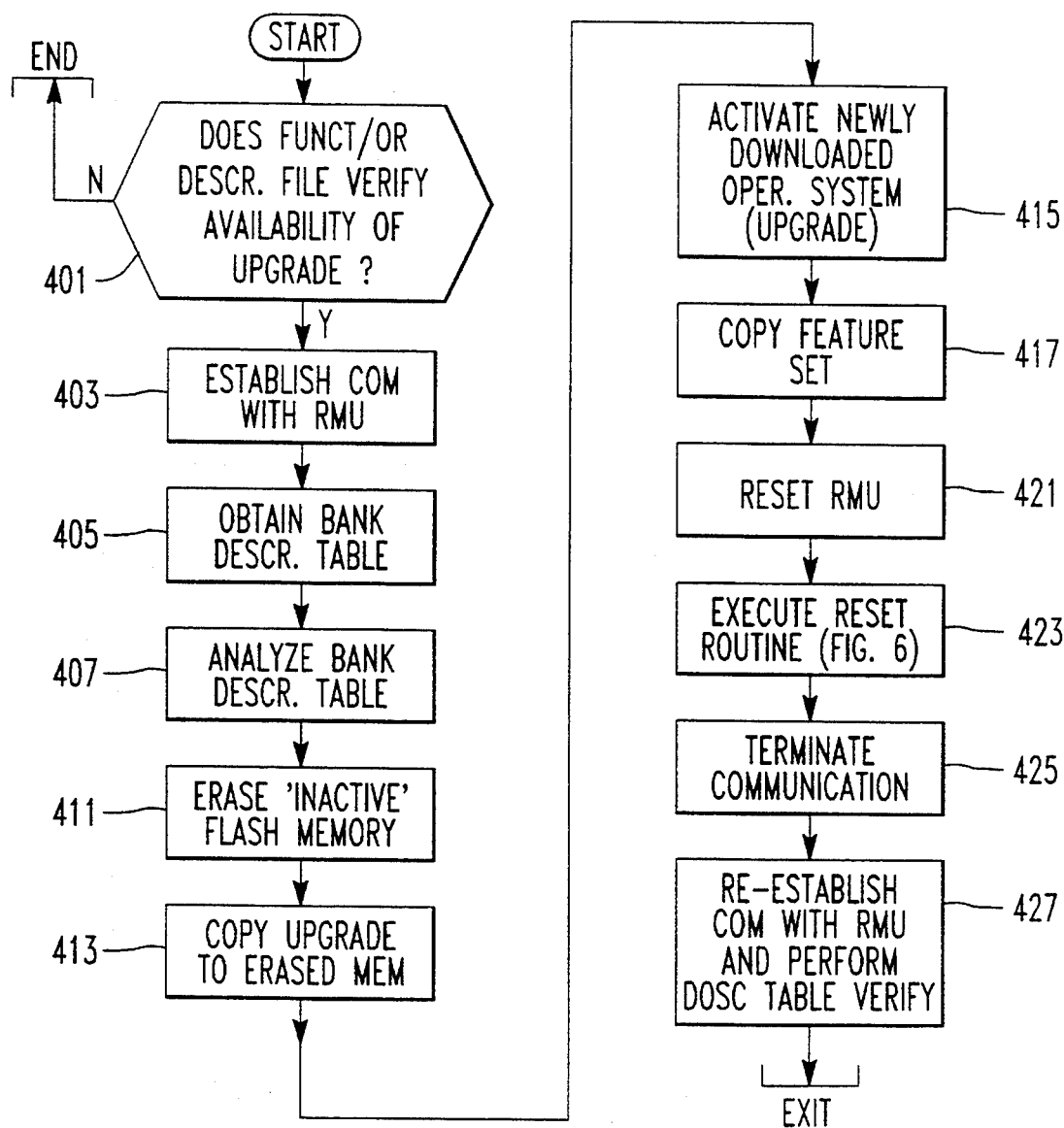
FIG. 4 is a flow diagram of a firmware 'upgrade' routine described in the above-identified co-pending application.
FIG. 5 diagrammatically illustrates a ten byte precursor opcode sequence.
Figure 6:
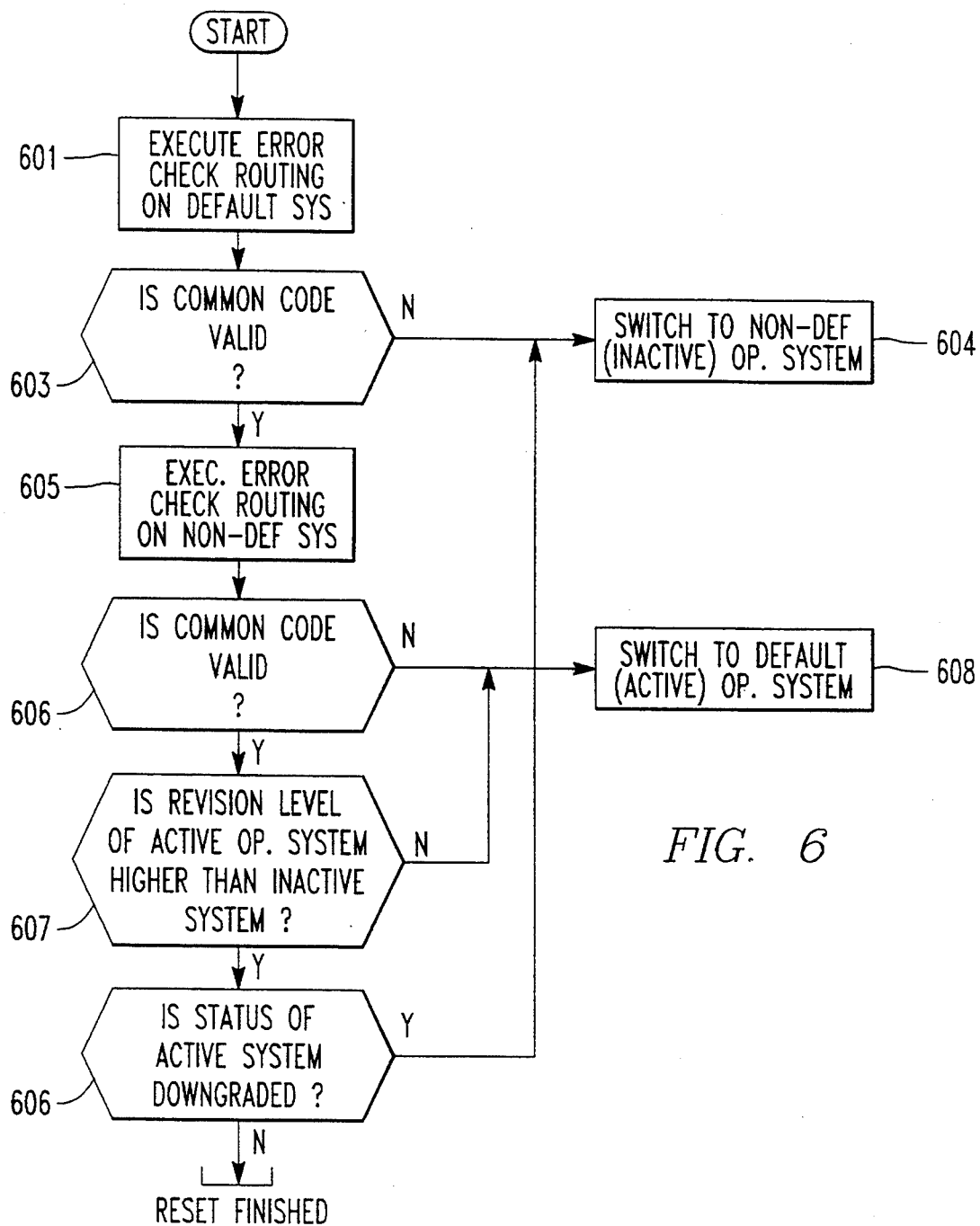
FIG. 6 is a flow diagram of a firmware 'reset' routine in accordance with the present invention.
Figure 7:
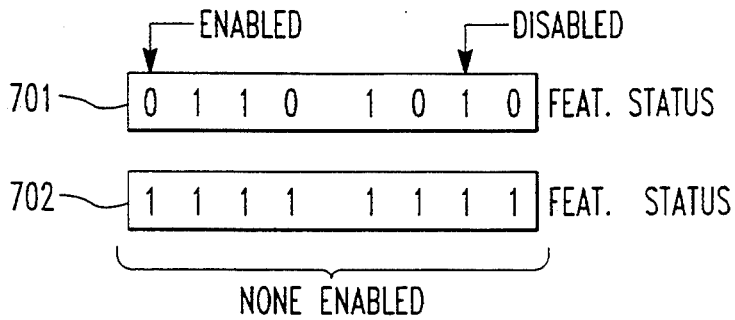
FIG. 7 shows feature activation switches resident in a two byte group.

Various aspects of the reset control mechanism of the present invention will be described with reference to FIGS. 4–7, of which FIGS. 4 and 6 are respective signal processing flow diagrams of a routine which is operative to ensure that, upon reset or power-up, the 'correct' one of the two quasi-redundant operating systems available to the microcontroller of the test unit will become the active operating system. As pointed out previously, the 'correct' system is normally either a prescribed default system at the time of installation when each memory system is a duplicate of the other, or, in the event of reprogramming, the previously off-line system that has been changed. However, should the modified inactive system contain an anomaly that will prevent successful operation of the test device, it is necessary that the inactive system remain off-line and the test unit continue to operate with the currently running version of the firmware.

For purposes of providing a non-limiting example, the reset mechanism of the present invention will be described in association with the firmware 'upgrade' routine described in the above-identified co-pending application, and an associated flow diagram for which is shown in FIG. 4. It should be observed, however, that the use of the present invention is not limited to only an upgrade, but is applicable to other firmware modification mechanisms employing redundant or quasi-redundant copies of an operating system, one of which is to be placed in service subsequent to the completion of a prescribed reprogram sequence, such as an upgrade.

As described in the above-referenced co-pending application, upgrading existing operating system firmware in the RMU involves the installation of a version of the firmware newer than the one currently running, for example a version containing enhanced versions of currently available features, or the addition of one or more features not previously provided in the earlier version. As a non-limiting example, such a feature may involve the ability of the unit to condition the telephone line with a prescribed set of operational or test parameters. For purposes of the present description, using conventional nomenclature in the industry, a previous version of RMU firmware will be denoted as RMU version 1.0, and an upgraded version will be denoted as RMU version 2.0.

Since an upgrade involves an enhancement to equipment functionality, a functionality/use descriptor file is maintained for each RMU user. This file contains information, inter alia, as to what firmware version a unit currently contains and what features it is permitted to use. The functionality/use descriptor file may also contain other information such as the number of RMUs to which the upgrade may be supplied. In other words, this descriptor file is effectively a permission and capability file that tells the installer what may and what may not be installed for a particular RMU.

Prior to establishing a connection from an upgrading source terminal (e.g. a video display terminal (21 in the system of FIG. 1) coupled through an associated modem to a central office) to a called RMU, the routine resident in the host processor of the upgrading data terminal unit first accesses the functionality/use descriptor file (step 401) and determines whether a requested upgrade may be performed. If the requested upgrade is not permitted (the answer to step 401 is NO), the routine is terminated. (At this point, the upgrade requester is also normally advised of the reason why the upgrade was not performed.)

If it has been determined from the functionality/use descriptor file that an upgrade to a specified RMU may proceed (the answer to step 401 is YES), then, as shown at step 403, a communication is established between the accessing terminal unit and the RMU and, at step 405, the host processor in the accessing unit requests from the RMU a copy of a bank descriptor table associated with each memory system of the RMU. The bank descriptor table is stored in a prescribed one of memory banks 33 of a respective system memory system 30 and indicates which operating system version is contained in that system and the contents (e.g. available and active features) of the operating system version currently stored in memory.

In step 407, the contents of the bank descriptor table are analyzed by the host processor to determine what firmware versions are currently stored in the respective memory systems (21 and 22). The purpose of this step is to facilitate the transfer or downloading of only those portions of firmware that are necessary to effect the requested upgrade. The host processor compares the current firmware versions stored in memory (e.g. RMU version 1.0) with the upgrade or target version of firmware (e.g. RMU version 2.0). For those banks of flash memory within the RMU's memory system which contain firmware identical to corresponding banks of the target version, a modification of such memory banks is unnecessary and is not performed.

As pointed out earlier, since modification of the contents of a bank of flash memory requires an erasure of the entire contents of the bank and then a rewriting of new data into the erased bank, in step 411, the host processor next proceeds to issue a command to the RMU to erase each bank of flash memory of the 'inactive' system which is to receive a target firmware upgrade or rewrite. The upgrading software is thereafter written into the requisite banks of flash memory of the RMU's inactive system, as shown at step 413, so that, after a system reset, the inactive system will contain the operating system which is to come on line in place of the currently running active system.

Whenever the contents of one or more memory banks of the inactive system are not to be changed, in order to facilitate (reduce the time required for) programming of the erased bank in the active system, the source of the code to be loaded into the inactive bank is preferably obtained from a bank in the active system, so that a direct copy operation may be performed over the RMU system bus. If the memory banks are changed, the upgrade is downloaded from the master terminal device.

Until the inactive system has been verified as a valid operating system in accordance with the reset routine to be described below with reference to FIG. 6, it is necessary to prevent an accidental boot-up from this off-line system (in which one or more memory banks have been erased) and thereby avoid anomalous operation of the RMU. For this purpose a precursor section of the common code memory space (e.g. the first ten bytes) are loaded with an instruction sequence that effectively prevents the off-line system from being booted up by forcing the off line system, if accessed, to perform a continuous no operation loop.

More specifically, whenever an upgrade occurs, the first thing to happen is the erasure of the inactive (off-line) system. Erasure of the off-line flash memory converts the logical state of every bit cell in the memory to a '1'. Immediately following this erasure operation, a ten byte 'no-op' (no operation) loop is written into the first ten addresses of the common portion of the off-line memory system. The purpose of this no-op loop is to prevent any accidental boot-up from the off-line, erased and partially upgraded system during the entire upgrade process. (For example, should there be a momentary loss of power during the upgrade process, then, when the power comes back on, the system may attempt to boot up through the off-line memory system.)

This no-op loop is diagrammatically shown in the illustrative ten byte opcode sequence of FIG. 5, which is comprised of a first 'disable schedule' byte (F3) at memory address zero, a three byte 'jump to address zero' sequence (C3 00 00) at memory addresses one-three, a three byte 'jump to address ten' sequence (C3 00 00) at memory addresses four-six, and a three byte 'jump to address zero' sequence (C3 00 00) at memory addresses seven-nine. The operating system program starts at memory address ten. Since address 1 contains a 'jump to address zero' byte sequence (C3 00 00), then any attempt to execute the operating system will result in a very tight no-op loop, which will repetitively cycle until a prescribed time-out expires, and the RMU processor is switched to the other memory system.

More particularly, whenever the RMU begins executing the firmware in either system, a time-out clock is started. Unless the operating system code, which is located in memory address space immediately following the no operation loop, begins executing prior to expiration of the time-out (e.g. two seconds), a switch to the other operating system is performed.

Once the banks that have not been changed have been copied from the active system to the erased bank of the off-line system, the The banks that have been changed will be downloaded from the host processor. Upon completion of the download, feature information, date of manufacture, and serial number will be copied from the active system to the inactive system (steps 415, 417).

As a final step before a reset is issued to the RMU, the ten byte sequence of FIG. 5 will be modified as follows. The three 'jump to zero' bytes (C3 00 00) are changed to (00 00 00) by programming each C3 byte to 00. By this step, the instruction content of each of addresses 1–9 will be a no-op instruction (00 00 00). Therefore, in step 415, when the ten byte opcode sequence of FIG. 5 is executed after reset, it will not be in a continuous 'jump to zero' loop. Instead, the process will execute successive no-op instructions and then begin actual program at address 10.

Once the transfer of the upgraded software to the designated bank(s) of the inactive system has been completed, (in the present example, once the currently inactive memory system contains a complete copy of RMU version 2.0), the host processor in the user's data terminal unit commands the RMU, in step 421, to reset itself.

With the RMU now containing two different versions of the operating system, one of which is the newer 'target' version obtained by the just completed upgrade sequence, and the other of which is the previously active routine which is to go off-line, the reset routine of the present invention, designated at step 423 and described in detail below, is executed to ensure that the 'correct' one of the two quasi-redundant systems available to the RMU's microcontroller will become the operating system.

As explained previously, after an upgrade, the 'correct' system to be run is normally the previously off-line system that has been changed to a newer version of the operating system. However, should the modified inactive system contain an anomaly that will prevent successful operation of the test device, it is necessary that the inactive system remain off-line and the unit continue to operate with the currently running version of the firmware.

In accordance with the reset routine, upon reset or power-up, the RMU's control processor defaults to that memory system which has not been marked invalid and which contains the highest version of firmware (RMU version 2.0 in the present example). A memory system is marked invalid by writing an invalid bit pattern into a prescribed bank. (At any given time, only one memory system can be marked invalid.) Once reset, the RMU will begin executing the version of its operating system as determined by the reset control routine described below. The host processor then terminates the connection (goes on-hook), in step 425.

Finally, in step 427, the host processor re-establishes a connection with the RMU and, as in step 405, requests a copy of the bank descriptor table contained in the RMU. As noted previously, the bank descriptor table details the contents of the firmware versions currently stored in the respective memory systems 21 and 22. Because of the upgrade, the bank descriptor table will identify both RMU version 1.0 (currently inactive) and the upgraded RMU version 2.0. The host processor examines the contents of the requested descriptor table in order to verify that the RMU is currently running the upgraded firmware version 2.0. If not, an error message is generated. Otherwise the host processor logs off.

RESET ROUTINE (FIG. 6)

Figure 3:
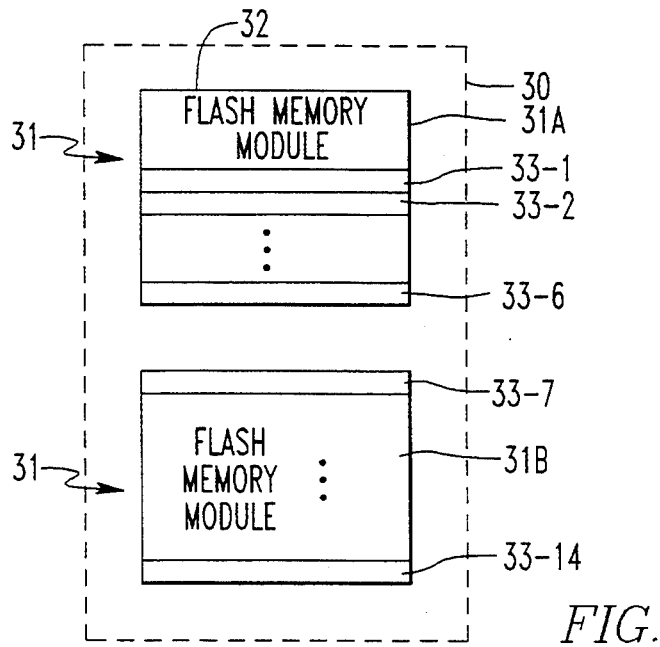
FIG. 3 diagrammatically illustrates the memory structure of a flash memory system employed in the architecture of FIG. 2.

As described above with reference to FIG. 3, an initial portion 32 of each flash memory system 30 contains the same or common operating system code, while the remainder of the memory space is divided into contiguous, but individually addressable, banks of memory (e.g. fourteen banks 33-1 . . . 33-14 in the present example) each of a prescribed capacity (sixteen kbytes/bank in the present example). The common operating system code 32 is the same for all versions of the software and is not programmable for the purpose of changing RMU functionality. Changes to RMU functionality, including upgrading or downgrading the operating system, or selectively activating or deactivating one or more operational features are effected by reprogramming one or more of the memory banks 33. Since the common code portion 32 of each memory system is the same, a relatively rapid mechanism for disqualifying an operating system is to determine whether its common code portion satisfies a prescribed error checking criterion.

For this purpose, as shown at step 601, the first step in the reset routine is to perform an error checking routine, such as a cyclical redundancy check (CRC) on the contents of the common portion 32 of whichever of the two operating system versions the RMU processor boots into. For purposes of the present example, it will be assumed that the RMU processor has booted into the upgraded operating system version RMU 2.0. If the CRC check reveals a valid common code portion (the answer to step 603 is YES), then, in step 605, the routine proceeds to check the validity of the common code portion of the other (now inactive) system (RMU version 1.0, in the present example). If the answer to step 603 is NO, it is inferred that the remainder of the RMU version 2.0 is invalid and, in step 604, the routine switches to (boots-up) the inactive system (RMU 1.0). Similarly, if the answer to query step 606 is NO, it is inferred that the remainder of the RMU version 1.0 is invalid and the routine continues to boot-up the upgraded system (RMU 2.0), step 608.

If the answer to each of steps 603 and 605 is YES, the routine next inquires in step 607 whether the revision level of the current version (RMU 2.0) of the operating system is higher than the revision level (RMU 1.0) of the other (non-booted) system. If the revision level of the current version of the operating system is not higher than the revision level of the other (non-booted) system (the answer to step 607 is NO), then the RMU switches to the other (currently inactive) system in step 608.

On the other hand, if the revision level of the current version of the operating system is higher than the revision level of the other (non-booted) system (the answer to step 607 is YES, which is the case of the present example), then the RMU proceeds to step 609, which looks to see if the current version of the operating system has been placed in a downgraded status. If the current version is the latest version of the operating system, but has been downgraded (the answer to step 609 is YES), the routine transitions to step 604 and instructs the RMU to switch to the other system. If, however, the currently booted operating system version is the latest version of the operating system, and is not in downgraded status (the answer to step 609 is NO), the reset is complete.

FEATURE ACTIVATION SWITCHES (FIG. 7)

As described in the above-identified co-pending application, feature activation is similar to an upgrade in that it involves an enhancement to the functionality of the currently active program, and involves turning on or enabling one or more programmable features contained within the active system, but not currently allowed to be used by the RMU. Namely, until activated, operational features are invisible to the RMU processor. Associated with each operational feature of a respective firmware version is a status or enabling bit, which is set to a '1' when the firmware is initially installed. Activation of a feature involves switching the state of the feature bit to '0'.

Each remotely switchable feature status bit is preferably contained in a feature status table stored in a prescribed portion of memory. In the example shown in FIG. 7, to accommodate up to sixteen features, a pair of sequential feature bytes 701, 702 may be employed. Via a virtual to physical map associated with the feature byte, the user may delineate which feature or features are to be selectively enabled in the active system. (As pointed out previously, with flash memory, programming a memory bank involves first erasing the entire bank and then changing the erased states of selected memory cells. Thus, when a feature is to be enabled or switched on, it's status bit in the feature table is changed from its original reset state '1' to an active state '0'.)

As will be appreciated from the foregoing description, the reset routine of the present invention ensures that the operating system modification mechanism described in the above-identified co-pending application will only boot up the 'correct' one of the two quasi-redundant systems available to the RMU's microcontroller after a system modification has been performed. This safeguard procedure effectively prevents the inadvertent presence of an anomaly in the modified inactive (off-line) system from being booted-up and causing potential erroneous operation of the RMU. Instead, the inactive system will remain off-line and the RMU will continue to operate with the currently running version of the firmware. In addition, the temporary insertion of a no-op code field just prior to the beginning of the program prevents the RMU's processor from accidentally booting up a modified system until the system has been verified as operational.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with a communication system having one or more remote sites at which respective programmable test devices are located, a respective programmable test device employing an operating system for monitoring and testing network lines and subscriber termination equipment coupled thereto, said communication system further including at least one data terminal unit which has the capability of accessing said programmable test device and causing a modification of said operating system, said respective programmable test device containing first and second memory systems, which contain respective first and second versions of said operating system, a method of controlling which of said first and second versions of said operating system is executed by said programmable test device when said programmable test device is placed in operation, comprising the steps of:

(a) processing the contents of a prescribed portion of said first and second memory systems to verify operational validity thereof; and (b) causing one of said first and second versions of said operating system contained in said first and second memory systems, for which step (a) has verified operational validity, which has the latest revision level and is not in a downgraded status, to be executed by said programmable test device.

2. A method according to claim 1, wherein step (b) comprises causing one of said first and second versions of said operating system stored in said first and second memory systems for which step (a) has verified operational validity, which has the latest revision level, but which is in a downgraded status, to be rendered inactive, and causing another of said first and second versions of said operating system contained in said first and second memory systems to be executed by said programmable test device.

3. A method according to claim 1, wherein step (b) comprises causing one of said first and second versions of said operating system stored in said first and second memory systems for which step (a) has failed to verify operational validity to be rendered inactive, and causing another of said first and second versions of said operating system contained in said first and second memory systems to be executed by said programmable test device.

4. A method according to claim 1, further including the preliminary step (c), prior to step (a), of loading a preliminary section of an inactive one of said first and second memory systems with an instruction sequence that effectively prevents the operating system version contained in said inactive one of said first and second memory systems from being booted up, until steps (a) and (b) have verified that the operating system version contained in said inactive one of said first and second memory systems is operationally valid.

5. A method according to claim 4, further including the step (d), in response to steps (a) and (b) having verified that the operating system version contained in said inactive one of said first and second memory systems is operationally valid, modifying said instruction sequence that has been loaded in step (c) into said preliminary section of said inactive one of said first and second memory systems, so as to allow the operating system version contained in said inactive one of said first and second memory systems to be executed by said programmable test device.

6. A method according to claim 4, wherein step (c) comprises forcing a version of said operating system contained in the inactive one of said first and second memory systems, if execution is initiated, to perform a continuous no operation loop and, in response to said no operation loop being performed for a prescribed time out period, causing another version of said operating system contained in said first and second memory systems to be executed by said programmable test device.

7. A method according to claim 6, further including step (d), in response to steps (a) and (b) having verified that the operating system version contained in the inactive one of said first and second memory systems is operationally valid, modifying said instruction sequence that has been loaded in step (c) into said preliminary section of said inactive one of said first and second memory systems, so as to effectively remove said no operation loop and allow the operating system version contained in said inactive one of said first and second memory systems to be executed by said programmable test device.

8. A method according to claim 1, wherein each of said first and second memory systems is comprised of electronically reprogrammable flash memory.

9. For use with a communication system having one or more remote sites at which respective programmable test devices are located, a respective programmable test device employing an operating system for monitoring and testing network lines and subscriber termination equipment coupled thereto, said communication system further including at least one data terminal unit which has the capability of accessing said programmable test device and causing a modification of said operating system, said respective programmable test device containing first and second memory systems, which contain respective first and second versions of said operating system, a method of controlling which of said first and second versions of said operating system is executed by said programmable test device when said programmable test device is placed in operation, comprising the steps of:

(a) establishing a communication path between a data terminal unit and said programmable test device;

(b) via said data terminal unit, modifying the version of the operating system contained in an inactive one of said first and second memory systems of said programmable test device with an upgraded version of the operating system to be employed by said programmable test device as a replacement for the currently employed version of the operating system contained in an active one of said first and second memory systems;

(c) causing said programmable test device to be reset, and default to the operating system contained in one of said first and second memory systems;

(d) processing the contents of a prescribed portion of said first and second memory systems to verify operational validity; and (e) in response to step (d) having verified operational validity of the prescribed portion of one of said first and second memory systems containing said upgraded version of said operating system, causing said upgraded version of said operating system to be executed by said programmable test device.

10. A method according to claim 9, wherein step (e) further comprises communicating, from said programmable test device to said data terminal unit, information representative of the contents of said prescribed portion of said first and second memory systems so as to verify the functional capability of said upgraded version of said operating system for execution by said programmable test device.

11. A method according to claim 9, wherein step (e) comprises causing a version of the operating system in said first and second memory systems, for which step (d) has verified operational validity of said prescribed portion, which has the latest revision level, but which is in a downgraded status, to be rendered inactive, and causing another version of said operating system contained in said first and second memory systems to be executed by said programmable test device.

12. A method according to claim 9, wherein step (e) comprises causing a version of the operating system in said first and second memory systems, for which step (d) has failed to verify operational validity of said prescribed portion, to be rendered inactive and causing another version of said operating system contained in said first and second memory systems to be executed by said programmable test device.

13. A method according to claim 9, wherein step (c) further includes loading a preliminary section of an inactive one of said first and second memory systems with an instruction sequence that effectively prevents the operating system version contained in said inactive one of said first and second memory systems from being booted up, until steps (d) and (e) have verified that the operating system version contained in the inactive one of said first and second memory systems is operationally valid.

14. A method according to claim 13, further including the step (f), in response to steps (d) and (e) having verified that the operating system version contained in the inactive one of said first and second memory systems is operationally valid, modifying said instruction sequence that has been loaded in step (c) into said preliminary section of said inactive one of said first and second memory systems, so as to allow the operating system version contained in said inactive one of said first and second memory systems to be executed by said programmable test device.

15. A method according to claim 14, wherein step (c) further comprises forcing a version of the operating system contained in the inactive one of said first and second memory systems, if execution thereof is initiated, to perform a continuous no operation loop and, in response to said no operation loop being performed for a prescribed time out period, causing another version of said operating system contained in said first and second memory systems to be executed by said programmable test device.

16. A method according to claim 15, further including the step (f), in response to steps (d) and (e) having verified that the operating system version contained in an inactive one of said first and second memory systems is operationally valid, modifying said instruction sequence that has been loaded in step (c) into said preliminary section of said inactive one of said first and second memory systems, so as to effectively remove said no operation loop therein and allow the operating system version contained in said inactive one of said first and second memory systems to be executed by said programmable test device.

17. A method according to claim 9, wherein each of said first and second memory systems is comprised of electronically reprogrammable flash memory.

18. For use with a communication system having one or more remote sites at which respective programmable test devices are located, a respective programmable test device having an operating system for monitoring and testing network lines and subscriber termination equipment coupled thereto, said system further including at least one data terminal unit which has the capability of accessing said programmable test device and causing a modification of said operating system, a respective programmable test device containing memory in which first and second versions of said operating system are storable, a method of controlling which of said first and second versions of said operating system is executed by said programmable test device when said programmable test device is placed in operation comprising the steps of:

(a) verifying operational validity of said memory; and (b) causing one of said first and second versions of said operating system, memory for which has been verified as being operationally valid in step (a), and which has the latest revision level, to be executed by said programmable test device.

19. A method according to claim 18, wherein step (b) comprises causing a version of said operating system, memory for which has been verified as being operationally valid in step (a), which has the latest revision level, but which is in a downgraded status, to be rendered inactive and causing another version of said operating system to be executed by said programmable test device.

20. A method according to claim 18, wherein step (b) comprises causing a version of the operating system, memory for which has not be verified as being operationally valid in step (a), to be rendered inactive, and causing another version of said operating system to be executed by said programmable test device.

21. A method according to claim 18, further including the preliminary step (c), prior to step (a), of loading a preliminary section of an inactive memory space with an instruction sequence that effectively prevents the operating system version contained in said inactive memory space from being booted up, until steps (a) and (b) have verified that the operating system version contained in said inactive memory space is operationally valid.

22. A method according to claim 21, further including the step (d), in response to steps (a) and (b) having verified that the operating system version contained in said inactive memory space is operationally valid, modifying said instruction sequence that has been loaded in step (c) into said preliminary section of said inactive memory space, so as to allow the operating system version contained in said inactive memory space to be executed by said programmable test device.

23. A method according to claim 21, wherein step (c) comprises forcing the operating system in said inactive memory space, if execution thereof is initiated, to perform a continuous no operation loop and, in response to said no operation loop being performed for a prescribed time out period, causing the other version of said operating system to be executed by said programmable test device.

24. A method according to claim 23, further including step (d), in response to steps (a) and (b) having verified that the operating system version contained in said inactive memory space is operationally valid, modifying said instruction sequence that has been loaded in step (c) into said preliminary section of said inactive memory space, so as to effectively remove said no operation loop therein and allow the operating system version in said inactive memory space to be executed by said programmable test device.

25. A method according to claim 18, wherein said memory space includes electronically reprogrammable flash memory.

26. For use with a communication system having one or more remote sites at which respective programmable test devices are located, a programmable test device employing an operating system for monitoring and testing network lines and subscriber termination equipment coupled thereto, said communication system further including at least one data terminal unit which has the capability of accessing said programmable test device and causing a modification of said operating system, said programmable test device containing memory in which first and second versions of said operating system are storable, a method of controlling which of said first and second operating systems is executed by said programmable test device when said programmable test device is placed in operation comprising the steps of:
(a) establishing a communication path between a data terminal unit and said programmable test device;
(b) via said data terminal unit, modifying a version of said operating system contained in an inactive portion of said memory of said programmable test device with another version of said operating system to be employed by said programmable test device as a replacement for the currently employed version of the operating system contained in an active portion of said memory;
(c) causing said programmable test device to be reset, and thereby default to one of said first and second versions of said operating system;
(d) verifying operational validity of memory; and
(e) in response to step (d) having verified operational validity of a portion of memory containing said another version of said operating system, causing said another version of said operating system to be executed by said programmable test device.

27. A method according to claim 26, wherein step (e) further comprises communicating, from said programmable test device to said data terminal unit, information representative of the contents of said memory so as to verify the functional capability of said another version of said operating system for execution by said programmable test device.

28. A method according to claim 26, wherein step (e) comprises causing a version of said operating system, for which step (d) has verified memory operational validity, which has the latest revision level, but which is in a downgraded status, to be rendered inactive and causing a further version of said operating system to be executed by said programmable test device.

29. A method according to claim 26, wherein step (e) comprises causing a version of said operating system, for which step (d) has failed to verify memory operational validity, to be rendered inactive and causing a further version of said operating system to be executed by said programmable test device.

30. A method according to claim 26, wherein step (c) further includes loading a preliminary section of an inactive portion of said memory with an instruction sequence that effectively prevents the operating system version contained in said inactive portion of memory from being booted up, until steps (d) and (e) have verified that the operating system version contained in said inactive portion of memory is operationally valid.

31. A method according to claim 30, further including the step (f), in response to steps (d) and (e) having verified that the operating system version contained in said inactive portion of memory is operationally valid, modifying said instruction sequence that has been loaded in step (c) into said preliminary section of said inactive portion of memory, so as to allow the operating system version contained in said inactive portion of memory to be executed by said programmable test device.

32. A method according to claim 31, wherein step (c) further comprises forcing an operating system version contained in said inactive portion of memory, if execution thereof is initiated, to perform a continuous no operation loop and, in response to said no operation loop being performed for a prescribed time out period, causing a further version of said operating system to be executed by said programmable test device.

33. A method according to claim 32, further including the step (f), in response to steps (d) and (e) having verified that the operating system version contained in said inactive portion of memory is operationally valid, modifying said instruction sequence that has been loaded in step (c) into said preliminary section of said inactive portion of memory, so as to effectively remove said no operation loop therein and allow the operating system version contained in said inactive portion of memory to be executed by said programmable test device.

34. A method according to claim 26, wherein said memory includes electronically reprogrammable flash memory.

* * * * *